(12) United States Patent
Citta et al.

(10) Patent No.: US 7,177,343 B1
(45) Date of Patent: Feb. 13, 2007

(54) COMPOUND CHIRP AND SYNCHRONIZER FOR USING SAME

(75) Inventors: Richard W. Citta, Oak Park, IL (US); Jingsong Xia, Mundelein, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/572,799

(22) Filed: May 17, 2000

(51) Int. Cl.
*H04B 1/00* (2006.01)
(52) U.S. Cl. .................................................. 375/139
(58) Field of Classification Search .............. 375/139, 375/130, 146, 147, 230, 343, 354, 316, 150, 375/364; 342/132
See application file for complete search history.

(56) References Cited

U.S. PATENT DOCUMENTS

| | | | | |
|---|---|---|---|---|
| 4,037,159 A | * | 7/1977 | Martin | 375/343 |
| 6,064,695 A | * | 5/2000 | Raphaeli | 375/230 |
| 6,304,619 B1 | * | 10/2001 | Citta et al. | 375/343 |
| 6,418,158 B1 | * | 7/2002 | Vishwanath et al. | 375/139 |
| 6,549,562 B1 | * | 4/2003 | Olaker et al. | 375/139 |
| 6,573,982 B1 | * | 6/2003 | Pruitt | 356/5.01 |

* cited by examiner

*Primary Examiner*—Khanh Tran
*Assistant Examiner*—Sam K. Ahn

(57) ABSTRACT

A compound chirp is provided in a received signal to permit a receiver to synchronize to the received signal. The compound chirp has temporally overlapping up frequency and down frequency components.

83 Claims, 13 Drawing Sheets

COMPOUND CHIRP AND SYNCHRONIZER FOR USING SAME

TECHNICAL FIELD OF THE INVENTION

The present invention relates to a compound chirp and to a synchronizer for using the compound chirp to synchronize a receiver to a received signal.

BACKGROUND OF THE INVENTION

Data communication systems typically involve a transmitter, a receiver, and a transmission path between the transmitter and receiver. The transmission path may be air or cables (wire or optical fiber). Data is frequently transmitted in a data communication system in a form which requires the receiver to be synchronized with the transmitter. For example, when data is spread in the frequency and/or time domains during transmission, the receiver must be synchronized to the transmitter in order to accurately recover the transmitted data.

A synchronizer typically uses a synchronization signal which is transmitted by the transmitter along with data. The synchronizer synchronizes the receiver to the synchronization signal and, when synchronization is acquired, the receiver is able to recover the data.

U.S. Pat. No. 6,304,619 discloses an up chirp and a down chirp which may be transmitted as a synchronization signal. A reference up chirp and a reference down chirp are correlated to the received signal in order to generate an up correlation peak index between the transmitted up chirp and the reference up chirp and a down correlation peak index between the transmitted down chirp and the reference down chirp. A frequency error is calculated based upon the difference between the up correlation peak index and the down correlation peak index, and a timing error is determined as the average of the up correlation peak index and the down correlation peak index. The frequency and timing errors are then used to acquire synchronization.

According to the arrangement disclosed in the aforementioned patent, the up chirp and the down chirp are transmitted sequentially in time, as shown in FIG. 1. Thus, the frequency of the up chirp increases from a frequency $f_0$ at a time $t_0$ to a frequency $f_N$ at a time $t_N$, and the frequency of the down chirp decreases from the frequency $f_N$ at the time $t_N$ to the frequency $f_0$ at a time $t_{2N}$.

The present invention, on the other hand, is directed to a compound chirp which combines the attributes of both an up chirp component and a down chirp component but which, as shown in FIG. 2, occupies a shorter time interval than if the up chirp component and the down chirp component were transmitted sequentially. That is, as shown in FIG. 2, the frequency of the compound chirp according to one embodiment of the present invention (i) increases from a frequency $f_0$ at a time $t_0$ to a frequency $f_1$ at a time $t_M$, (ii) decreases from a frequency $f_2$ at the time $t_0$ to a frequency $f_1"$ at the time $t_M$, (iii) increases from a frequency $f_2"$ at the time $t_0$ to a frequency $f_3$ at the time $t_M$, (iv) decreases from a frequency $f_4$ at the time $t_0$ to a frequency $f_3"$ at the time $t_M$, (v) increases from a frequency $f_4"$ at the time $t_0$ to a frequency $f_5$ at the time $t_M$, (vi) decreases from a frequency $f_6$ at the time $t_0$ to a frequency $f_5"$ at the time $t_M$, (vii) increases from a frequency $f_6"$ at the time $t_0$ to a frequency $f_7$ at the time $t_M$, and (viii) decreases from a frequency $f_8$ at the time $t_0$ to a frequency $f_7"$ at the time $t_M$. The time $t_M$ may be shorter than, equal to, or longer than the time $t_N$. As shown in FIG. 2, this compound chirp appears to be folded or pleated. The compound chirp of the present invention improves synchronization response times because it has a shorter duration than a non-folded chirp spanning the same bandwidth.

SUMMARY OF THE INVENTION

According to one aspect of the present invention, a receiver receives a signal containing a compound chirp having frequency up and frequency down components. The frequency up and down components overlap in time. The receiver comprises first and second correlators and a processor. The first correlator correlates the received signal with the frequency up component to produce a first correlation. The second correlator correlates the received signal with the frequency down component to produce a second correlation. The processor determines synchronization parameters dependent upon the first and second correlations.

According to another aspect of the present invention, a compound chirp electrical signal comprises an up component and a down component. The up component varies in frequency from $f_0$ to $f_1$, and the down component varies in frequency from about $f_1$ to $f_2$, wherein $f_0<f_1<f_2$. The up and down components overlap in time so that $f_0$ of the up component occurs near in time to $f_2$ of the down component.

According to yet another aspect of the present invention, a method comprises: a) receiving a signal containing a transmitted compound chirp having N samples, wherein the chirp is constructed so that the chirp effectively spans mN samples, wherein m and N are integers, and wherein m and N are unequal to one; b) correlating the received signal with a reference chirp; and, c) synchronizing a receiver in response to the correlation.

According to a further aspect of the present invention, a method of receiving a received signal containing a compound chirp having frequency up and frequency down components is provided. The frequency up and down components overlap in time. The method comprises: a) correlating the received signal with the frequency up component to produce a first correlation; b) correlating the received signal with the frequency down component to produce a second correlation; and, c) synchronizing a receiver based upon the first and second correlations.

According to yet a further aspect of the present invention, a compound chirp electrical signal comprises K frequency folds. Each frequency fold includes an up component and a down component, $K \geq$ one, and all of the K frequency folds overlap in time.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 3:
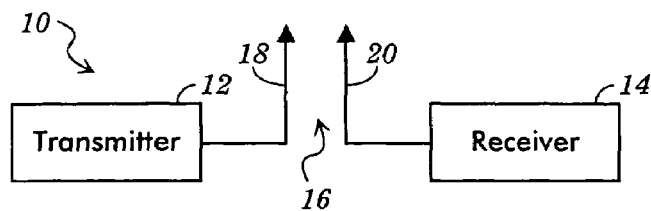
FIG. 3 is a schematic diagram of a transmitter and a receiver which provide an exemplary environment for the present invention.

As shown in FIG. 3, a communication system 10 implementing synchronization according to the present invention generally includes a transmitter 12 and a receiver 14. The transmitter 12 transmits a signal containing data and a compound chirp over a communication path 16 to the receiver 14. For example, the communication path 16 can be air, space, cables, or any other medium supporting communication between the transmitter 12 and the receiver 14. To this extent, the transmitter 12 has a signal propagation device 18 such as a modem, an antenna, a satellite dish, or other equipment in order to propagate the signal through the communication path 16 to the receiver 14. Similarly, the receiver 14 has a signal acquisition device 20 which acquires the transmitted signal from the communication path 16 and provides the acquired signal to the receiver 14.

Figure 4:
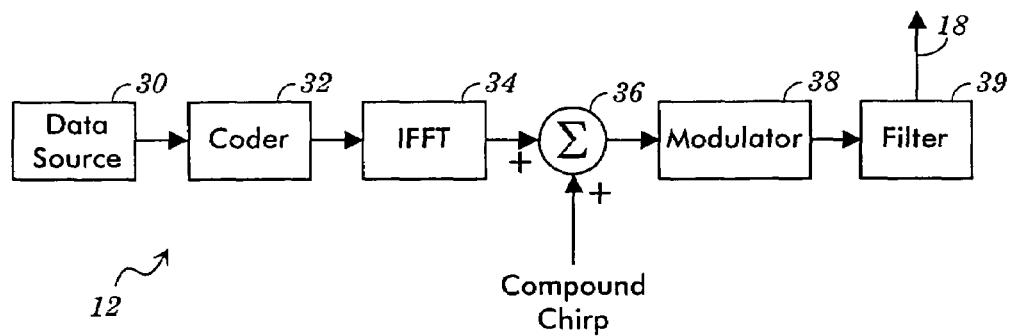
FIG. 4 shows an exemplary transmitter which may be used for the transmitter of FIG. 3.

As shown in FIG. 4, the transmitter 12 generally includes a data source 30, a coder 32 which codes the data supplied by the data source 30, an IFFT (inverse Fast Fourier Transform) 34 which performs a spectral transformation on the output of the coder 32, an adder 36 which adds the compound chirp of the present invention to the output of the IFFT 34, a modulator 38 which modulates the output of the adder 36 onto a carrier, and a filter 39, such as a raised cosine filter, which filters the modulated carrier for supply to the signal propagation device 18. The coder 32 may implement any desired coding technique.

Figure 5:
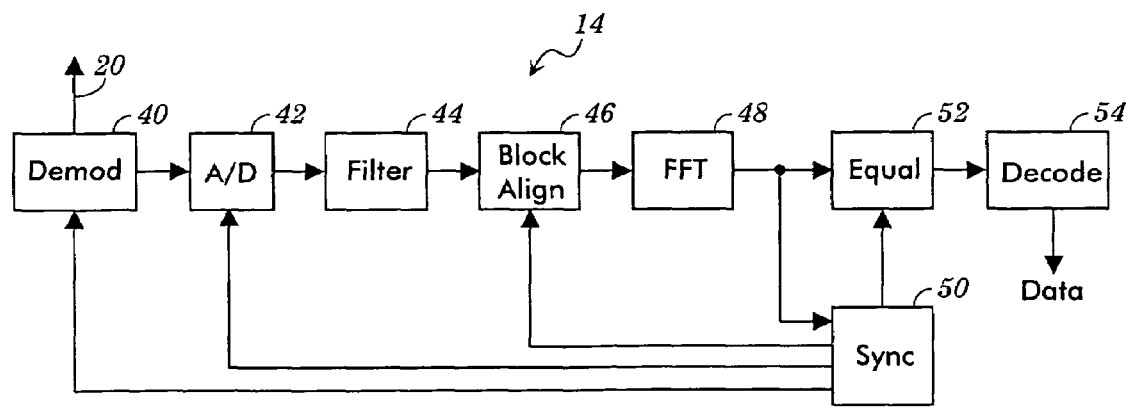
FIG. 5 shows an exemplary receiver which may be used for the receiver of FIG. 3, wherein the receiver includes a synchronizer in accordance with the present invention.

As shown in FIG. 5, the receiver 14, in accordance with the present invention, includes a demodulator 40 which receives the signal acquired by the signal acquisition device 20 from the communication path 16, which demodulates the acquired signal down to baseband, and which supplies the demodulated signal to an analog to digital (A/D) convertor 42. The A/D convertor 42 samples the demodulated signal at a predetermined sampling frequency, which is alternatively referred to herein as the Nyquist frequency. (On the other hand, the demodulator 40 and the A/D convertor 42 may be arranged to demodulate the acquired signal down to IF, to sample the acquired signal at IF, and to demodulate the samples down to baseband.) The samples from the demodulator 40 and the A/D convertor 42 are filtered by a filter 44, such as a raised cosine filter.

The filtered samples are supplied to a block alignment 46, which operates in response to a block offset signal as discussed below, and which adjusts the actual temporal location of data blocks as received relative to the temporal location of the received data blocks as assumed by the receiver 14. The output of the block alignment 46 is spectrally transformed by an FFT (Fast Fourier Transform) 48. The output of the FFT 48 is provided to a synchronizer 50 which synchronizes the receiver 14 by supplying a carrier frequency offset signal to the demodulator 40, a signal to control the sampling frequency of the A/D convertor 42, and a data block alignment signal to control the block alignment 46. The output of the FFT 48 is also provided to an equalizer 52 which reduces intersymbol or interdata interference in the received data blocks. Finally, a decoder 54 decodes the equalized signal in order to recover the data which was originally supplied by the data source 30.

In order for the synchronizer 50 to synchronize the receiver 14 to the signal received from the transmitter 12, the transmitter 12 provides a compound chirp along with the data propagated by the signal propagation device 18 over the communication path 16 to the signal acquisition device 20. Two embodiments of a compound chirp, one for VSB systems and one for QAM systems, are described herein, although compound chirps for other types of systems can be provided as well.

VSB Compound Chirp

Figure 6:
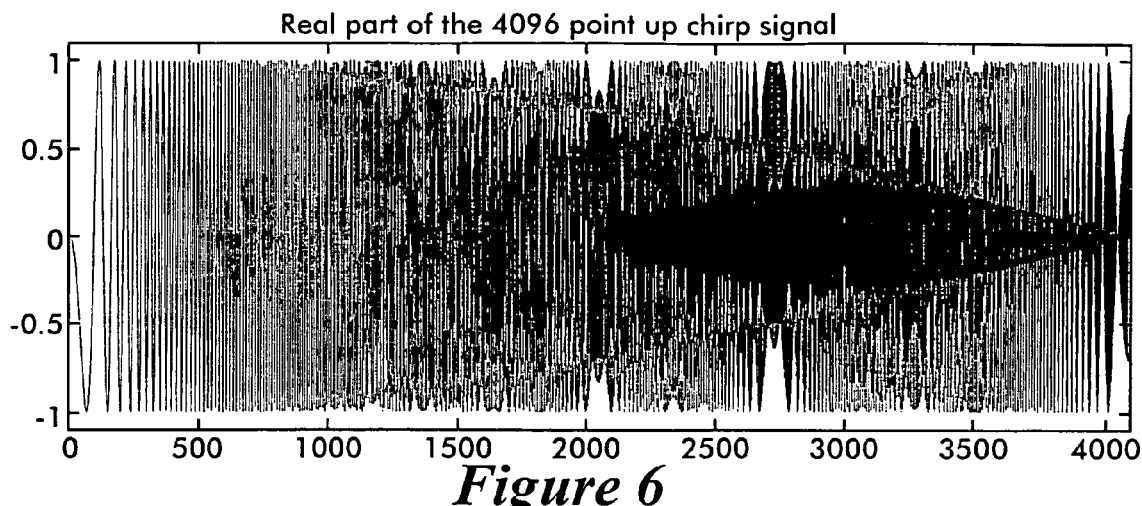
FIG. 6 shows the real part of a 4096 point up chirp signal which may be used to generate a compound chirp according to a first embodiment of the present invention.
Figure 7:
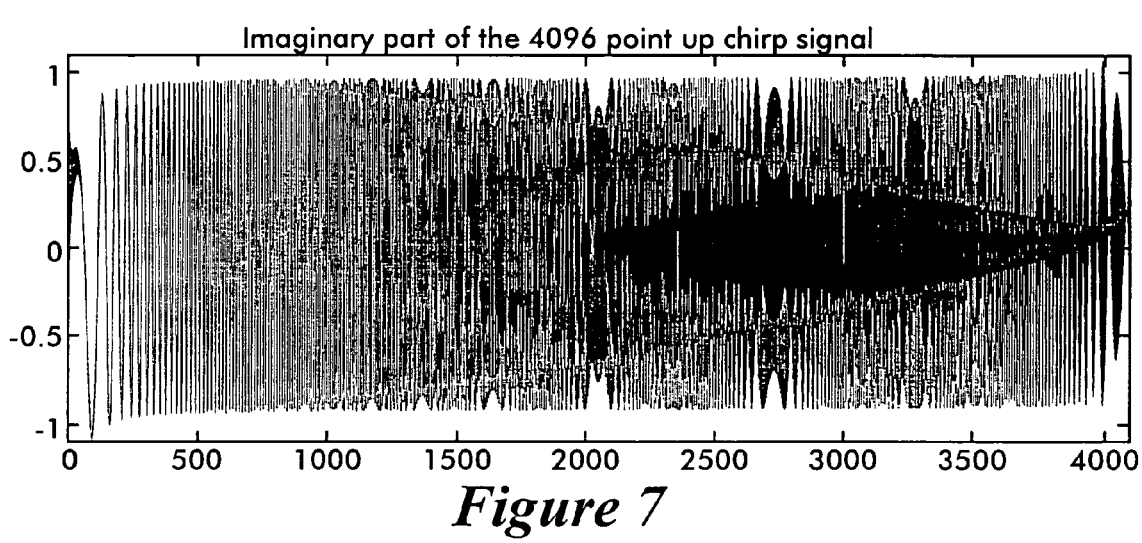
FIG. 7 shows the imaginary part of the 4096 point up chirp signal which may be used to generate the compound chirp according to the first embodiment of the present invention.
Figure 8:
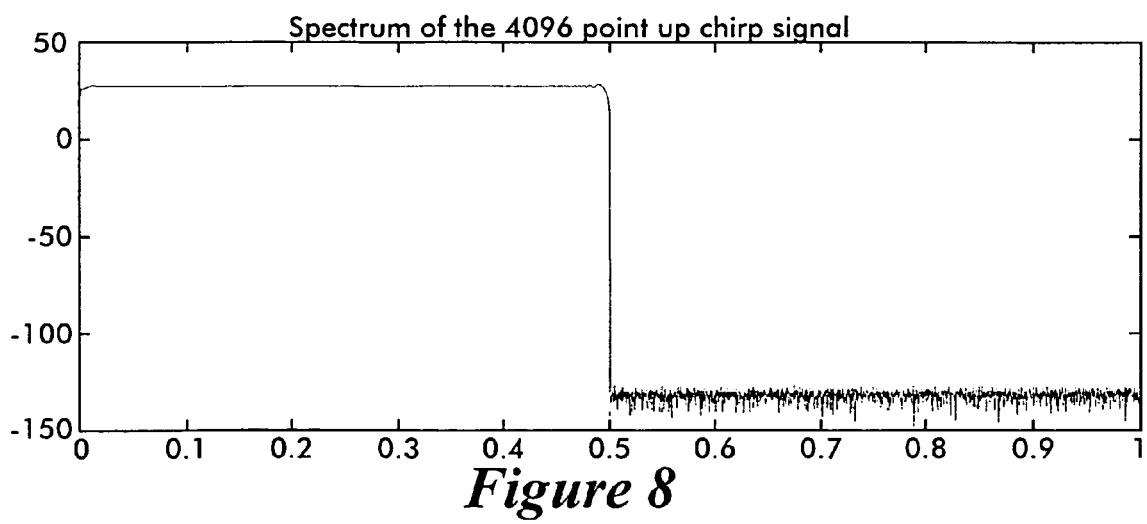
FIG. 8 shows the spectrum of the 4096 point up chirp signal shown in FIGS. 6 and 7.

A linear frequency modulation signal, having 4096 samples and a frequency increasing from a low value such as zero to a high value such as the Nyquist frequency, is created based upon a sampling frequency fs. For example, fs=10.76 MHZ. The linear frequency modulation signal may be provided in accordance with $\sin(\omega t^2)$. The real part of the 4,096 samples is shown in FIG. 6, the imaginary part of the 4,096 samples is shown in FIG. 7, and the spectrum of the 4,096 samples is shown in FIG. 8. (Alternatively, the 4,096 samples could be derived from a signal having a decreasing frequency.)

The 4,096 samples are partitioned evenly into eight segments each having 512 samples, where the first segment contains the first 512 samples, the second segment contains the next 512 samples, ..., and the eighth segment contains the last 512 samples. The complex conjugate is taken of the even numbered segments (i.e., the second, fourth, sixth, and eighth segments) in order to produce a 90° phase shift, and the complex conjugated even numbered segments are each reversed by index. During index reversal, the first sample and the last sample of the complex conjugated second segment are switched, the second sample and the next to last sample of the complex conjugated second segment are switched, and so on. Also, the first sample and the last sample of the complex conjugated fourth segment are switched, the second sample and the next to last sample of the complex conjugated fourth segment are switched, and so on. The sixth and eighth complex conjugated segments are similarly processed.

Figure 9:
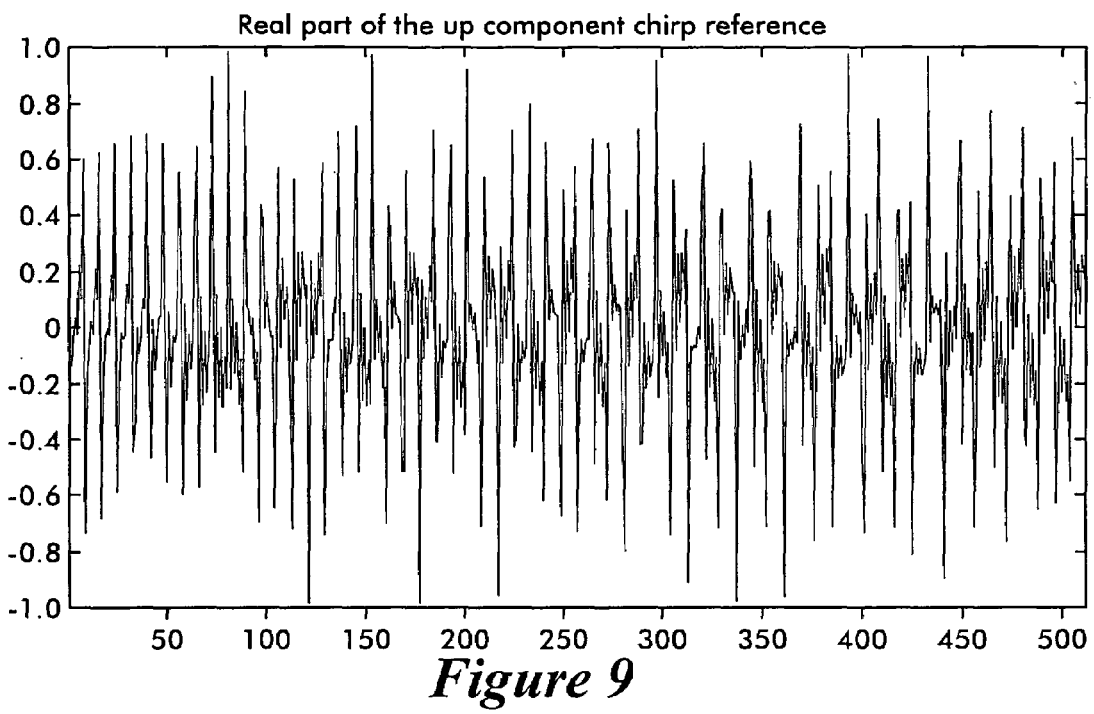
FIG. 9 shows the real part of an up component derived from the chirp signal shown in FIGS. 6, 7, and 8, where this up component may be used as a reference up chirp in connection with a synchronizer.
Figure 10:
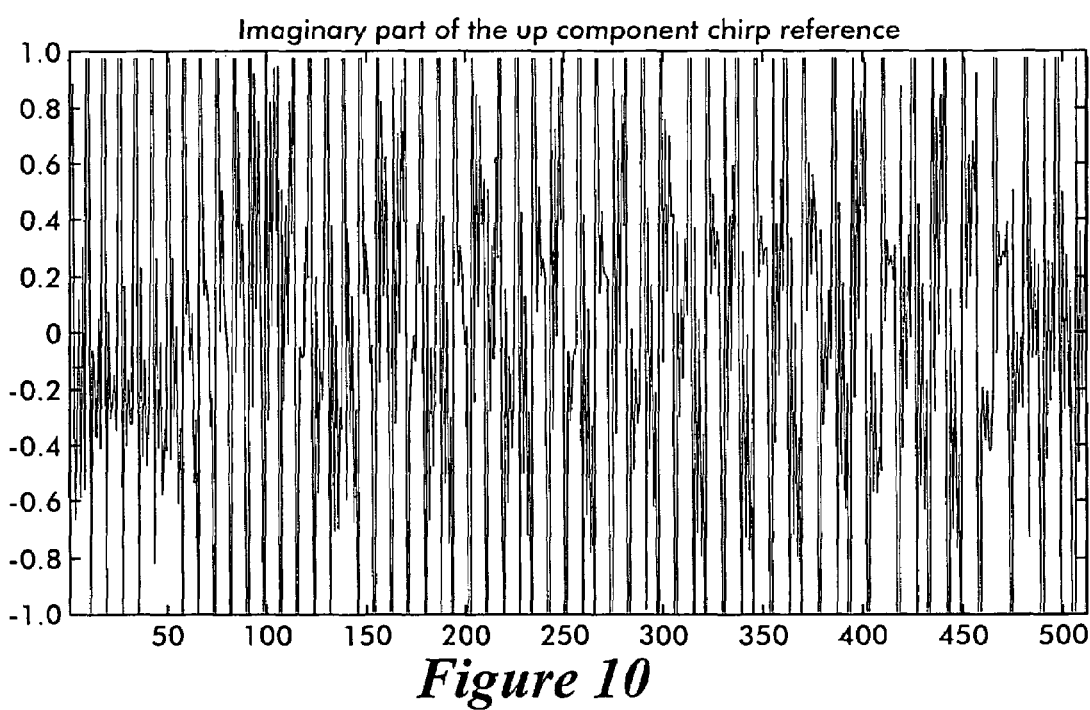
FIG. 10 shows the imaginary part of the up component whose real part is shown in FIG. 9.
Figure 11:
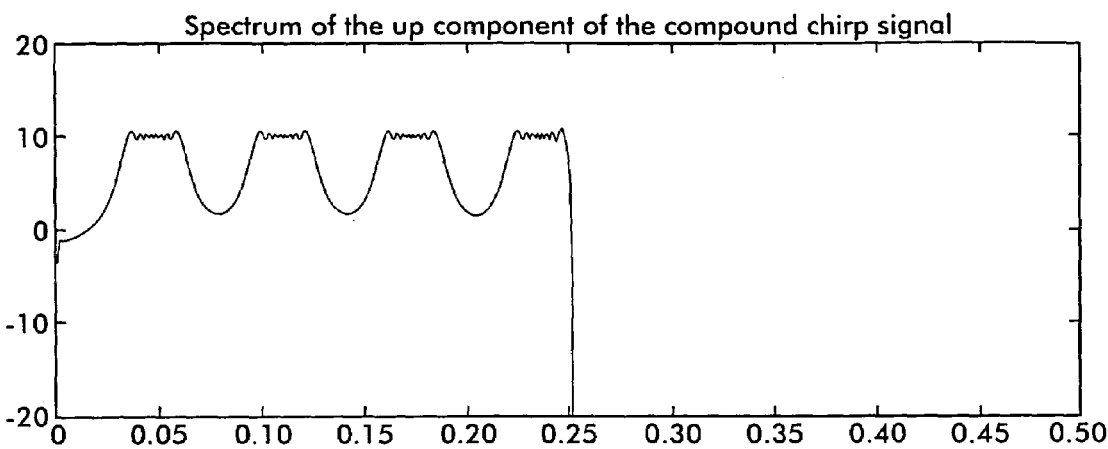
FIG. 11 shows the spectrum of this up component.

The first, third, fifth, and seventh segments are linearly added to produce a 512 sample up component of the compound chirp. Thus, the first samples of the first, third, fifth, and seventh segments are added to produce a first sample in the 512 sample up component, the second samples of the first, third, fifth, and seventh segments are added to produce a second sample in the 512 sample up component, and so on. The 512 sample up component is suitably transformed (such as by an FFT) to produce a spectrum that is used as a reference up component by the synchronizer 50 to acquire synchronization as described below. FIG. 9 shows the real part of the 512 sample reference up component, FIG. 10 shows the imaginary part of the 512 sample reference up component, and FIG. 11 shows the spectrum of the 512 sample reference up component.

Figure 14:
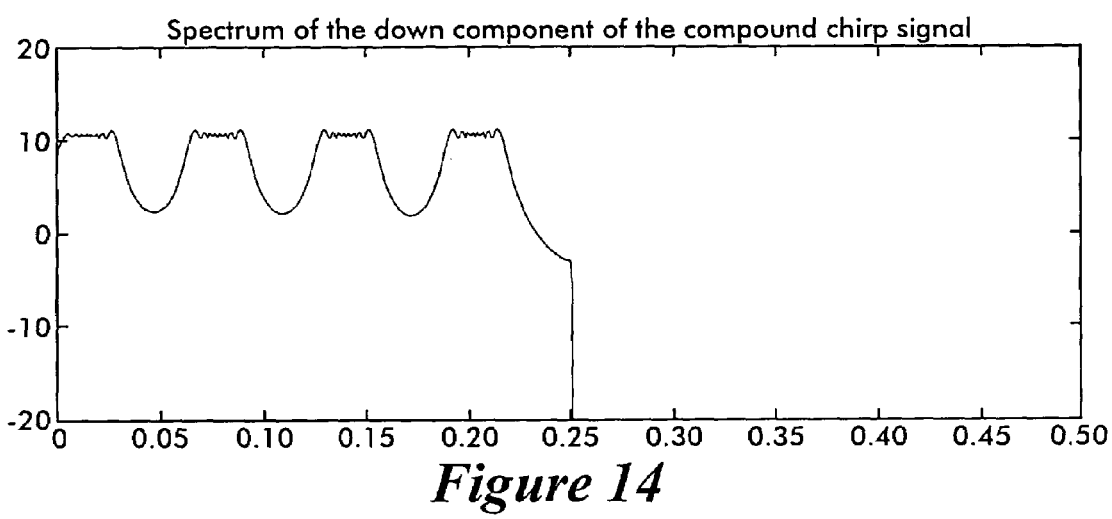
FIG. 14 shows the spectrum of this down component.
Figure 12:
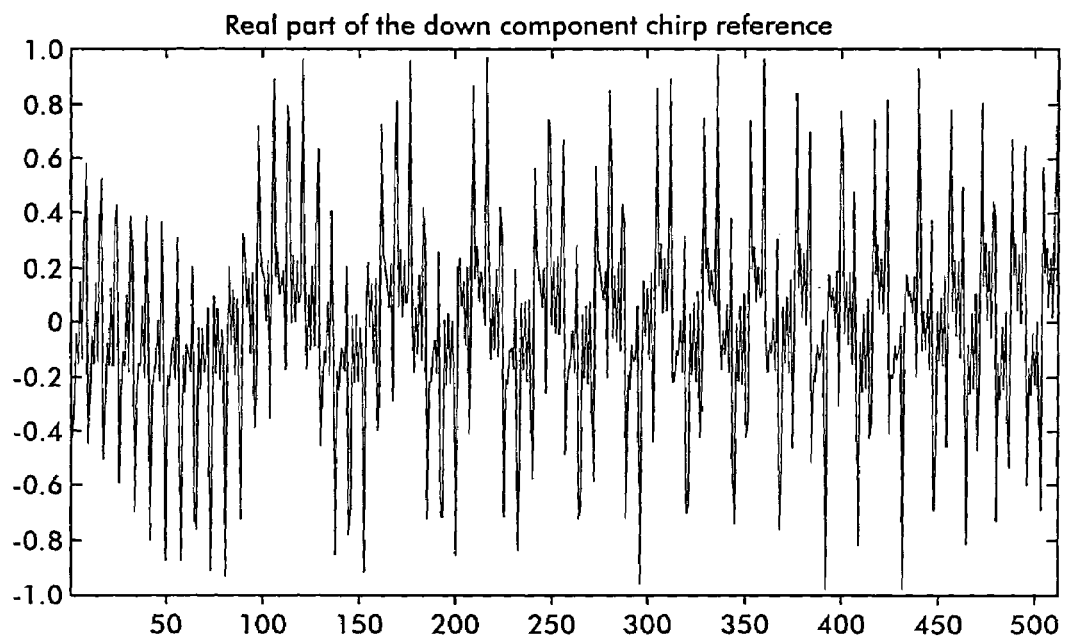
FIG. 12 shows the real part of a down component derived from the chirp signal shown in FIGS. 6, 7, and 8, where this down component may be used as a reference down chirp in connection with a synchronizer.
Figure 13:
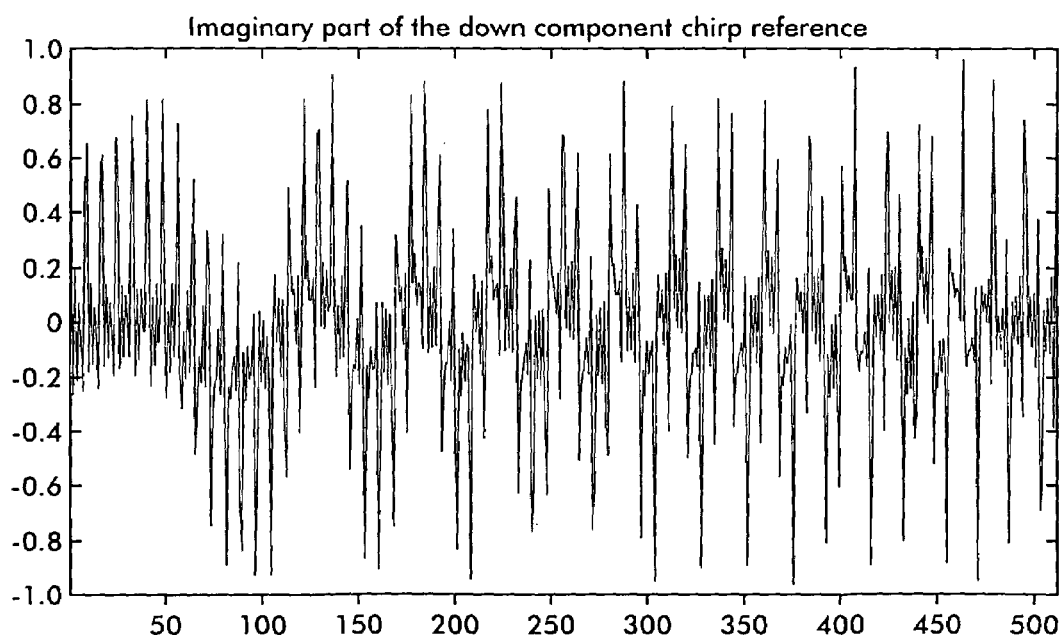
FIG. 13 shows the imaginary part of the down component whose real part is shown in FIG. 13.

Similarly, the complex conjugated and index reversed second, fourth, sixth, and eighth segments are linearly added to produce a 512 sample down component of a compound chirp. The 512 sample down component is suitably transformed (such as by an FFT) to produce a spectrum that is used as a reference down component by the synchronizer 50 to acquire synchronization as described below. FIG. 12 shows the real part of the 512 sample reference down component, FIG. 13 shows the imaginary part of the 512 sample reference down component, and FIG. 14 shows the spectrum of the 512 sample reference down component.

Figure 1:
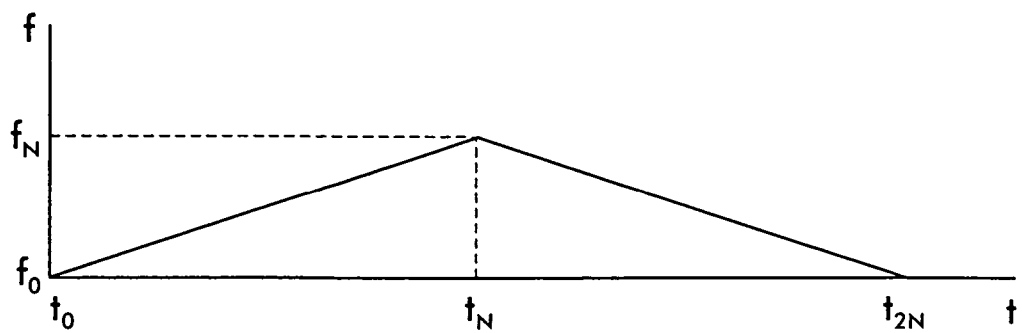
FIG. 1 is a graph of a non-folded chirp having an up chirp component followed by a down chirp component in accordance with the aforementioned U.S. Pat. No. 6,304,619.
Figure 2:
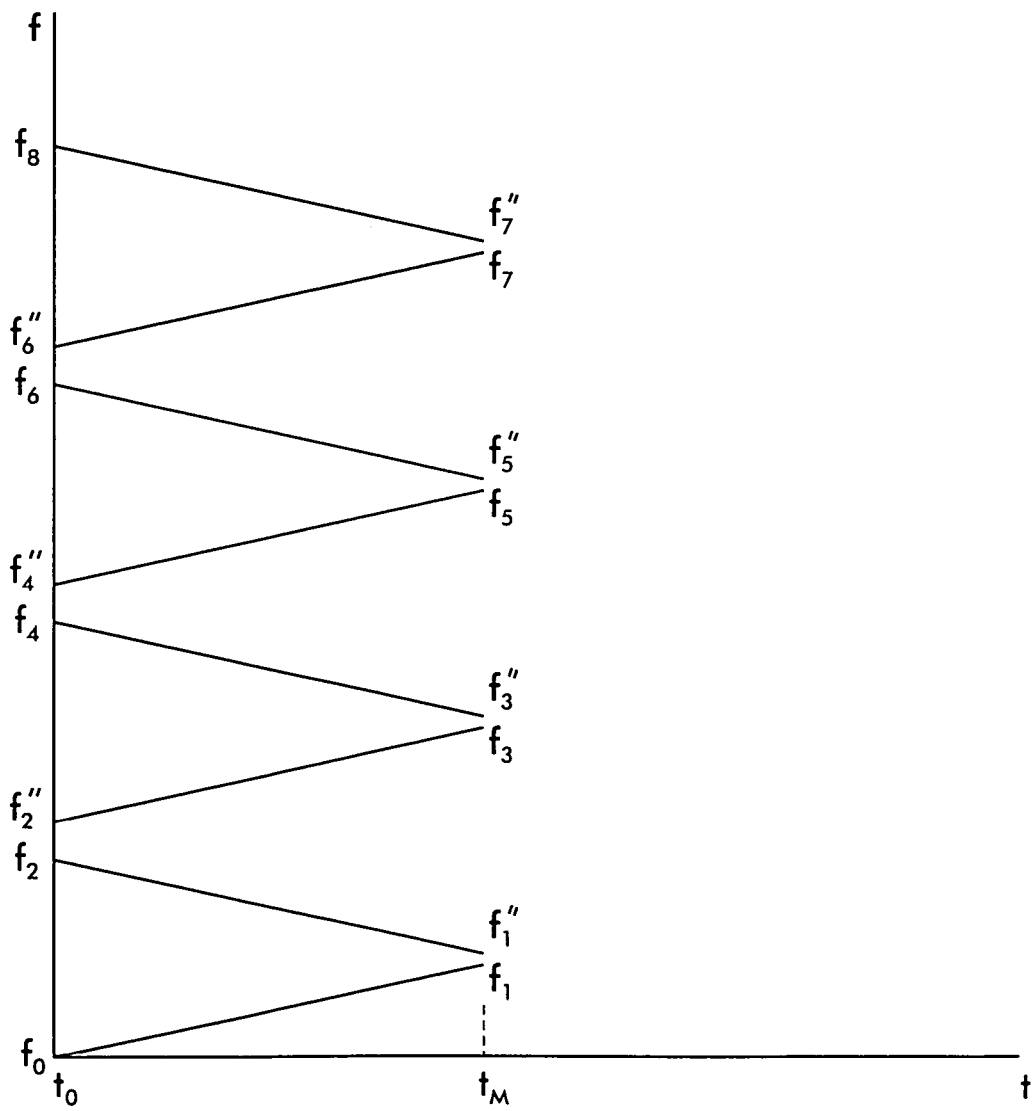
FIG. 2 is a graph showing an exemplary compound chirp according to the present invention.
Figure 17:
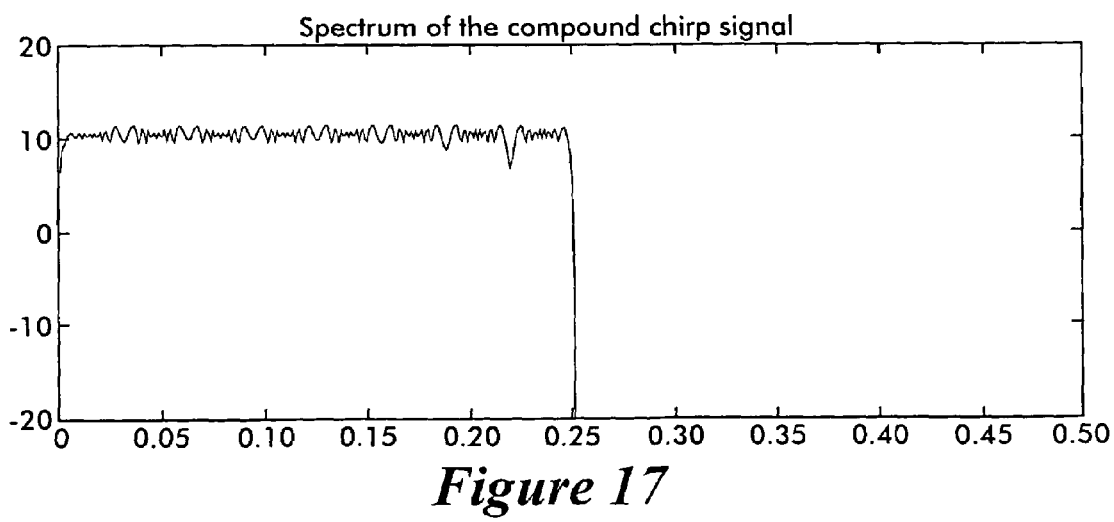
FIG. 17 shows the spectrum of the compound chirp shown in FIGS. 15 and 16.
Figure 15:
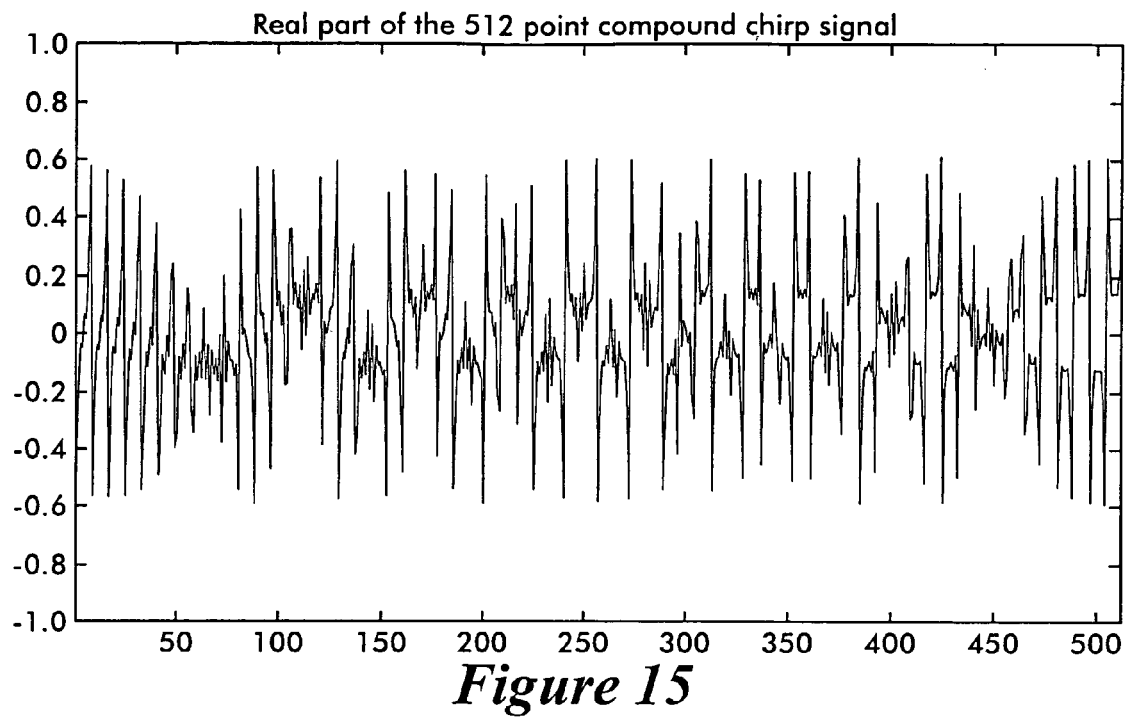
FIG. 15 shows the real part of a compound chirp which is derived from up chirp signal shown in FIGS. 6, 7, and 8.
Figure 16:
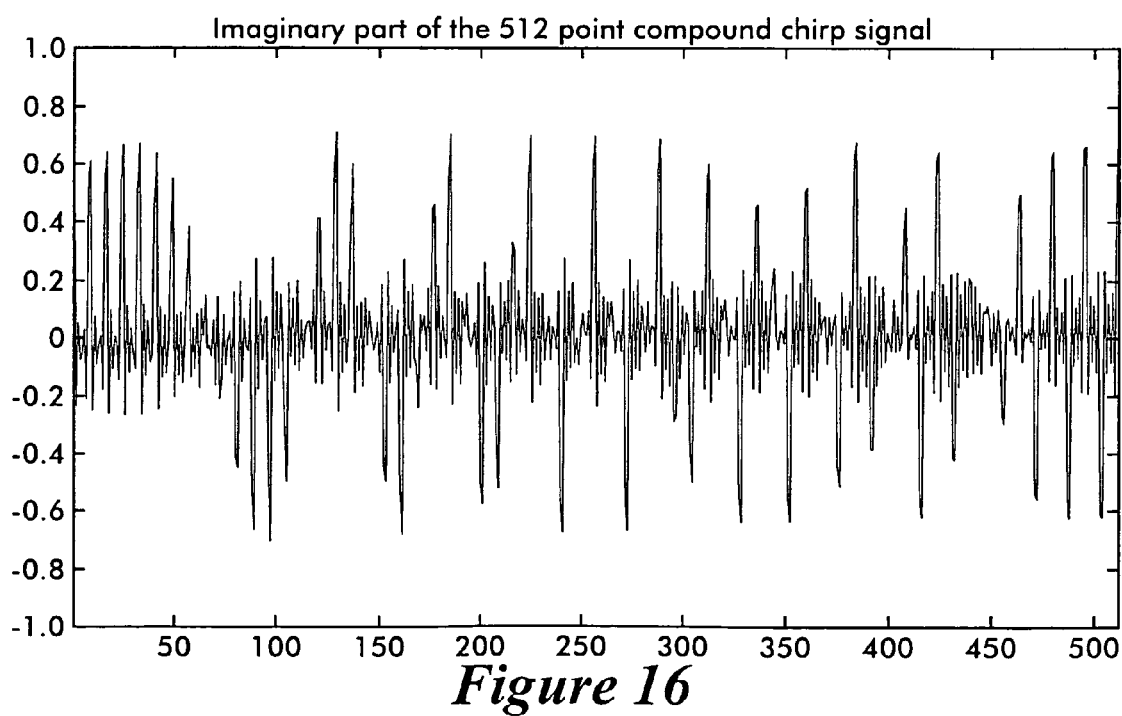
FIG. 16 shows the imaginary part of the compound chirp which is derived from up chirp signal shown in FIGS. 6, 7, and 8.

The 512 sample reference up component and the 512 sample reference down component are linearly added to produce the 512 sample compound chirp shown in FIG. 2 that is transmitted by the transmitter 12 and that permits the receiver 14 to acquire synchronization. The samples in the 512 sample compound chirp are suitably weighted so as to normalize power. FIG. 15 shows the real part of the 512 point compound chirp, FIG. 16 shows the imaginary part of the 512 point compound chirp, and FIG. 17 shows the spectrum of the compound chirp.

The 90° phase shift introduced into the second, fourth, sixth, and eighth segments as a result of the complex conjugation is necessary so that, when the reference down component and the reference up component are combined to produce the compound chirp, the corners of the compound chirp (such as $f_1$, $f_1''$ of FIG. 2) do not have precisely the same frequency.

Figure 18:
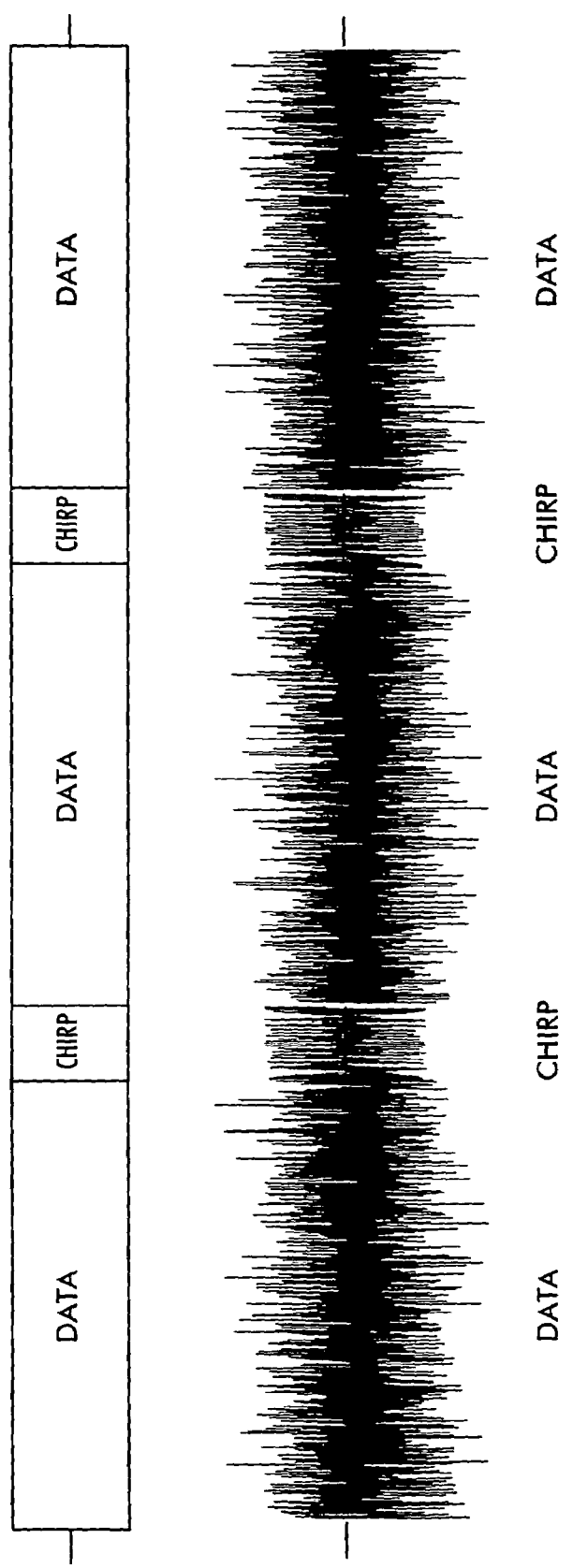
FIG. 18 shows an exemplary data structure which includes the compound chirp and data according to the first embodiment of the present invention.

FIG. 18 shows an exemplary data and compound chirp structure transmitted by the transmitter 12 when operating in a VSB mode, although other structures could be used. According to the structure shown in FIG. 18, data is transmitted in a series of data blocks. A compound chirp is transmitted before each data block and, as described in more detail below, permits the receiver 14 to synchronize to the received signal so that the receiver can properly recover the data in the data blocks.

QAM Compound Chirp

A linear frequency modulation signal, having 16,384 sample points and a frequency increasing from a low value such as zero to a high value such as the Nyquist frequency is created based upon a sampling frequency $fs_1$. For example, $fs_1$=5.38 MHZ. The linear frequency modulation signal may be provided in accordance with $\sin(\omega t^2)$. (Alternatively, the 16,384 samples could be derived from a signal having a decreasing frequency.)

These 16,384 samples are Hilbert transformed and the upper half of the samples (i.e., the 8,192 samples from sample 8,193 to sample 16,384 in the time domain and from ½ fs to fs in the frequency domain) are complex conjugated in order to phase shift the samples by 90° and are reversed by index in order to form a down component from fs to ½ fs in the frequency domain. The lower half of the samples (i.e., the 8,192 samples from sample 1 to sample 8,192 in the time domain and from 0 to ½ fs in the frequency domain) forms an up component of a compound chirp.

Accordingly, an 8,192 sample up component and an 8,192 sample down component are formed. The 8,192 sample up component and the 8,192 sample down component are each down sampled. These chirps may be down sampled, for example, by discarding all even samples or all odd samples. The samples remaining after down sampling (i.e., the samples in the resulting 4,096 sample up component and in the resulting 4,096 sample down component) are suitably weighted so as to normalize power. The resulting 4,096 sample up component may be spectrally transformed and then used as the reference up component by the receiver 14 when operating in a QAM mode. Similarly, the resulting 4,096 sample down component may be spectrally transformed and then used as a reference down component by the receiver 14 when operating in a QAM mode. The reference up component and the reference down component are linearly added to produce the 4,096 sample compound chirp for QAM mode receivers.

Figure 19:
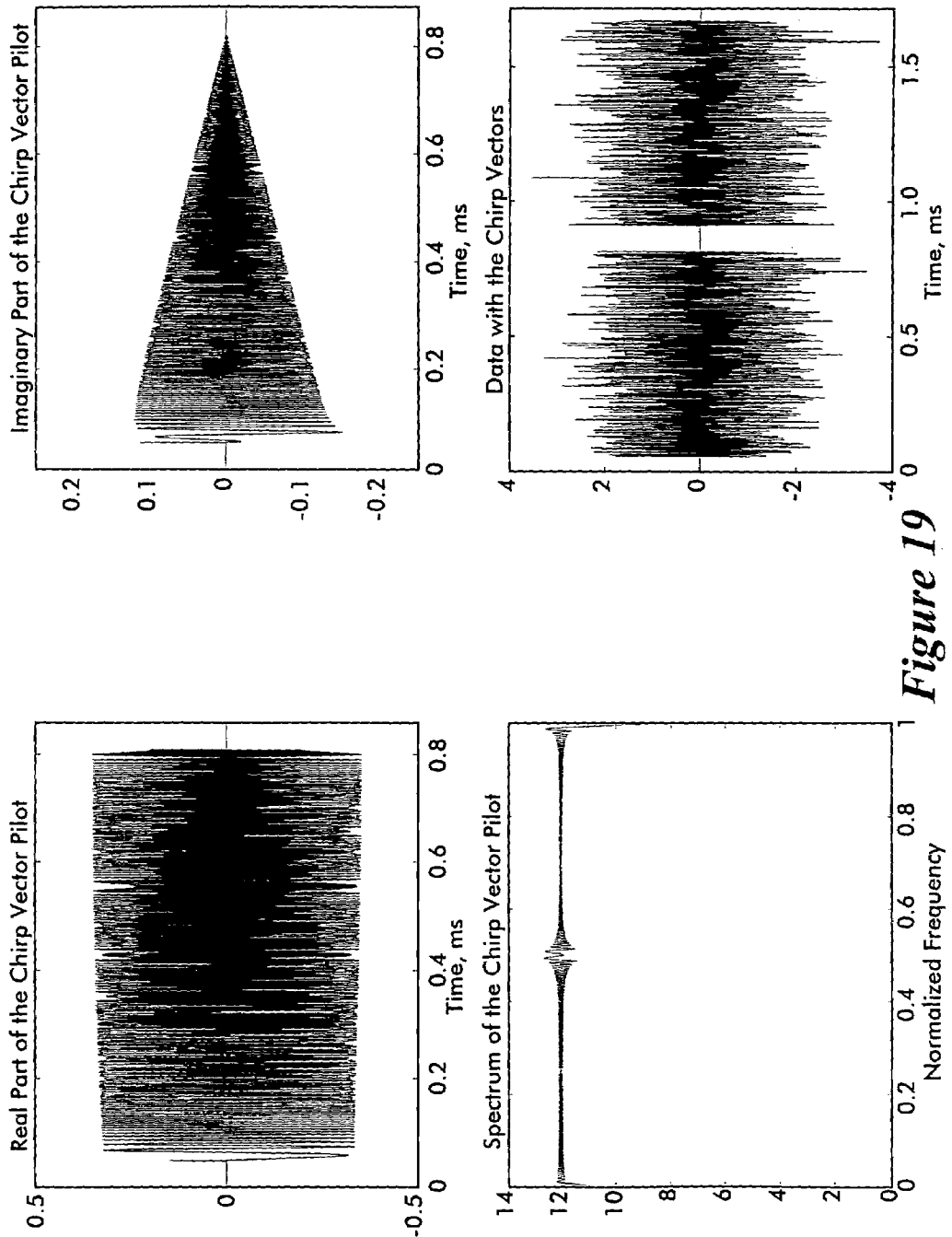
FIGS. 19 and 20 show properties of a compound chirp according to a second embodiment of the present invention.
Figure 20:
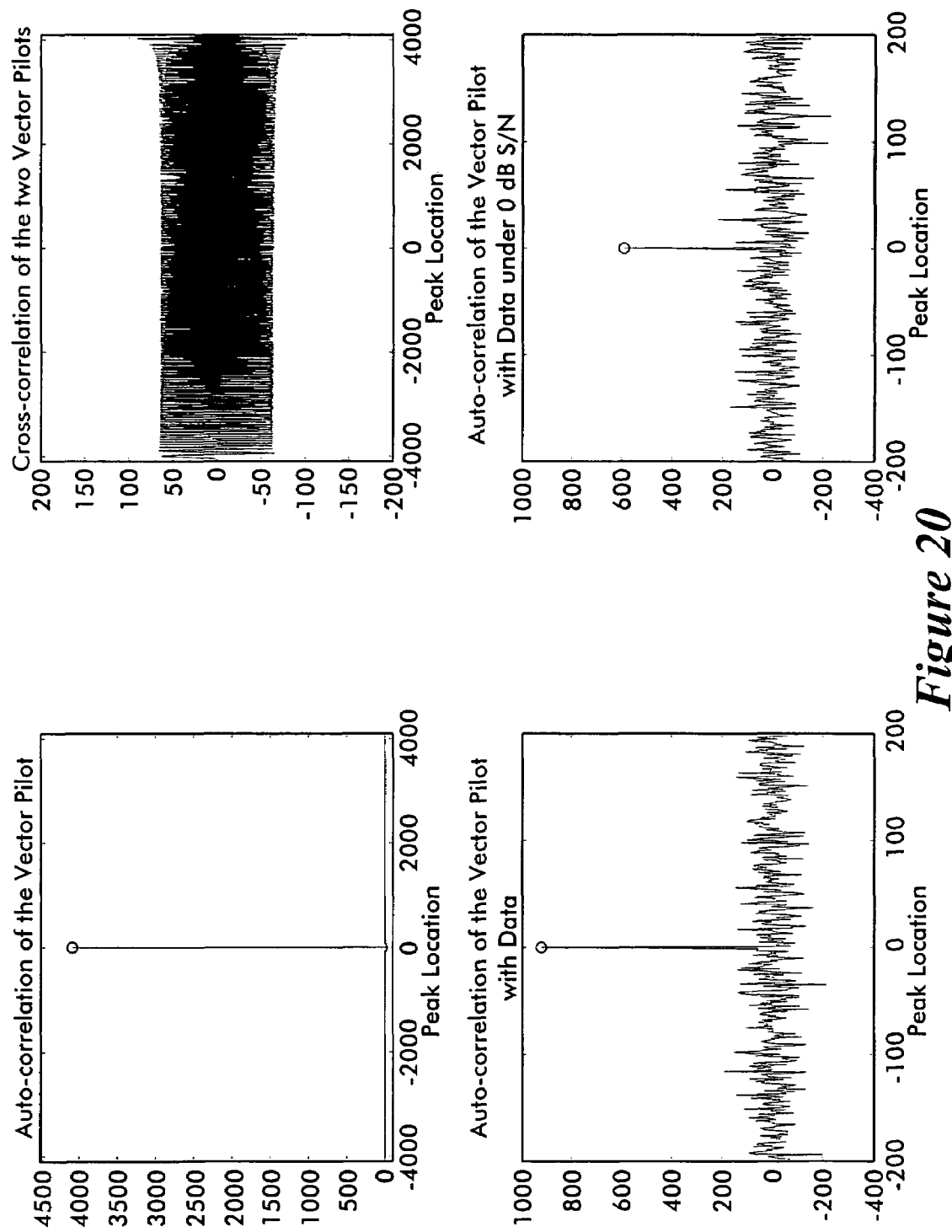
Figure 21:
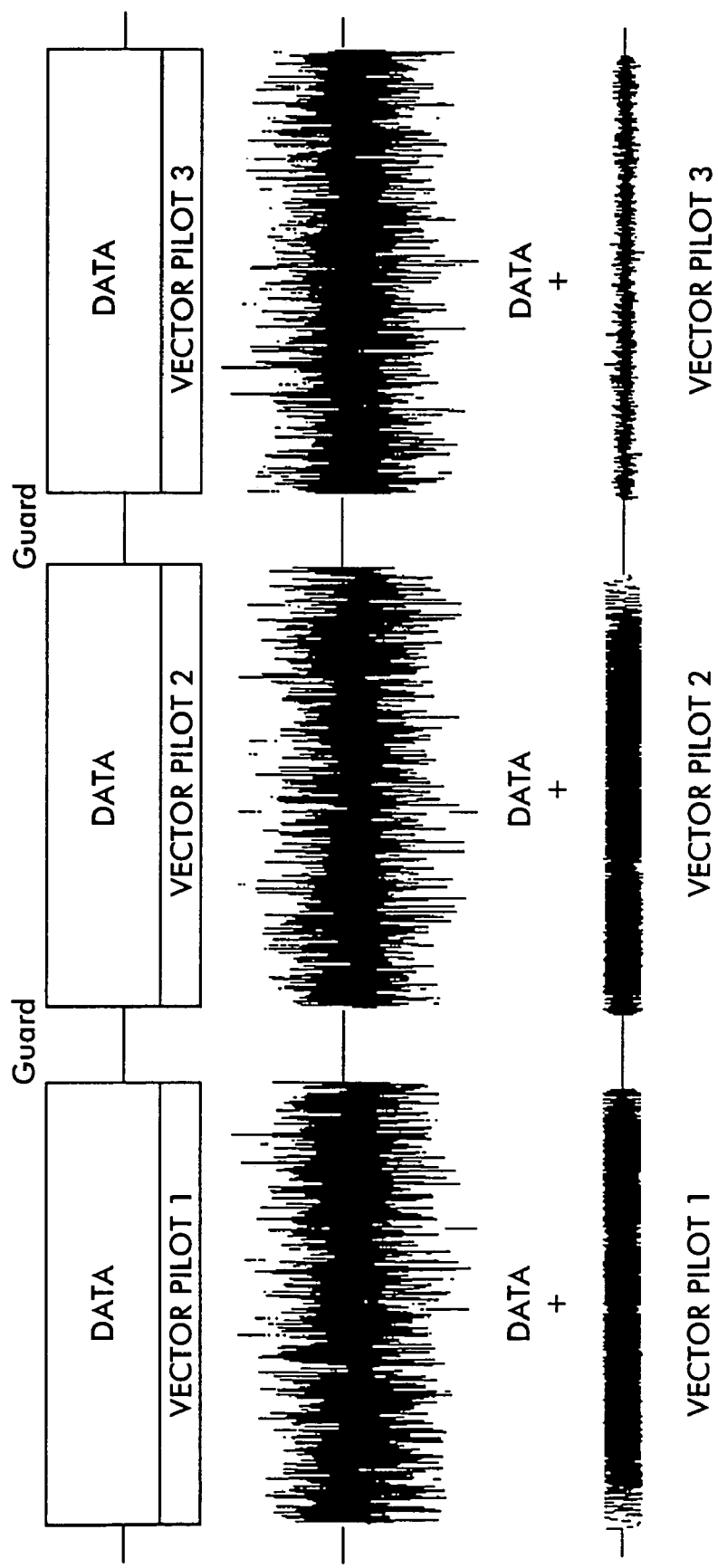
FIG. 21 shows an exemplary data structure which includes the compound chirp and data according to the second embodiment of the present invention.

FIGS. 19 and 20 show the properties of the 4,096 sample QAM compound chirp. FIG. 21 shows an exemplary data and chirp structure transmitted by the transmitter 12 when operating in a QAM mode, although other structures could be used. According to the structure shown in FIG. 21, data is transmitted in a series of data blocks. A compound chirp is transmitted so as to overlap each data block in time. The compound chirp may be transmitted 12 db down, for example, from its corresponding data block and, as described in more detail below, permits the receiver 14, when operating in the QAM mode, to synchronize to the received signal so that the receiver 14 can properly recover the data in the data blocks.

Synchronizer 50

Figure 22:
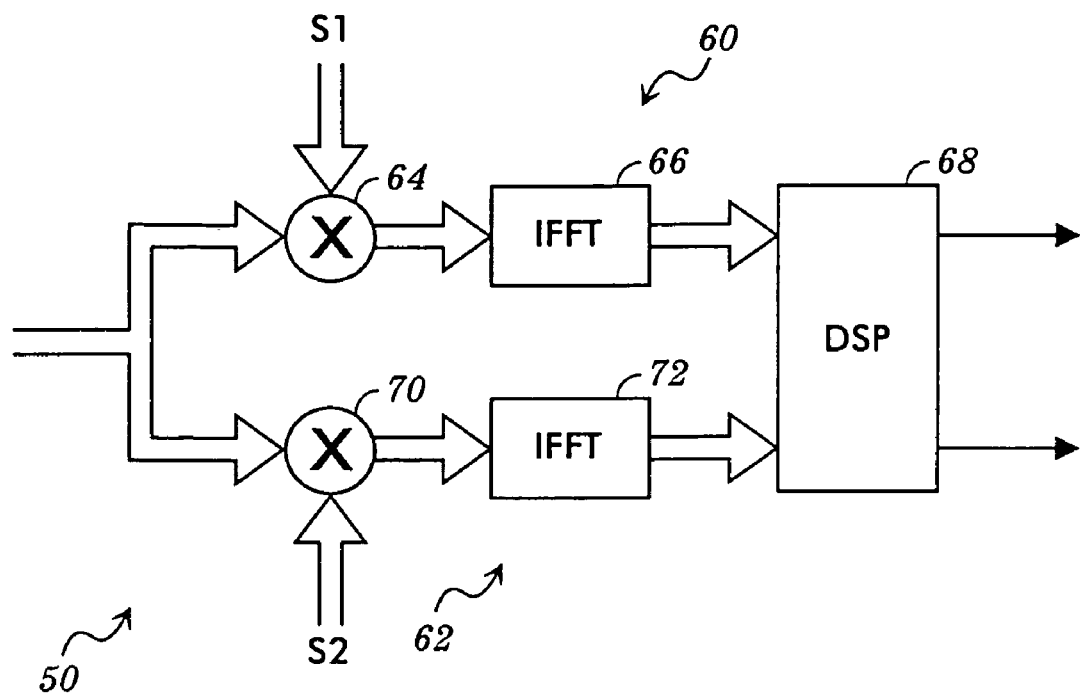
FIG. 22 shows the synchronizer of FIG. 5 arranged for coarse synchronization.

Coarse adjustment of the synchronizer 50 is described herein with respect to FIG. 22. As discussed above, the compound chirp (either VSB or QAM) is added to the transmitted data by the transmitter 12. In the communication path 16, the signal propagated by the signal propagation device 18 may encounter various signal impairments such as frequency and phase offset. In the receiver 14, it is necessary to lock the carrier and the sampling clock and to perform data block alignment. The compound chirp signal contains the necessary information for the synchronizer 50 to perform these locking and alignment functions.

The synchronizer 50 includes a pair of correlators 60 and 62. The correlator 60 includes a multiplier 64 which multiplies the output of the FFT 48 by a reference S1, an inverse spectral transformation 66 which performs an inverse spectral transformation on the output of the multiplier 64, and a processor 68 which, inter alia, performs a summation operation to complete the up correlation. The correlator 62 includes a multiplier 70 which multiplies the output of the FFT 48 by a reference S2, an inverse spectral transformation 72 which performs an inverse spectral transformation on the output of the multiplier 70, and the processor 68 which, inter alia, performs a summation operation to complete the down correlation. The reference S1 is the reference up component of either the VSB type or the QAM type as described above, depending upon whether the receiver 14 is operating in the VSB mode or the QAM mode. Similarly, the reference S2 is the reference down component of either the VSB type or the QAM type as described above, depending upon whether the receiver 14 is operating in the VSB mode or the QAM mode. By correlating the received signal to the reference up and down components, any frequency displacement between the received compound chirp and the reference up and down components appears as time shifts between the compound chirp and the reference up and down components. That is, the correlation peak looks as if it is time shifted from the center correlation output.

Figure 23:
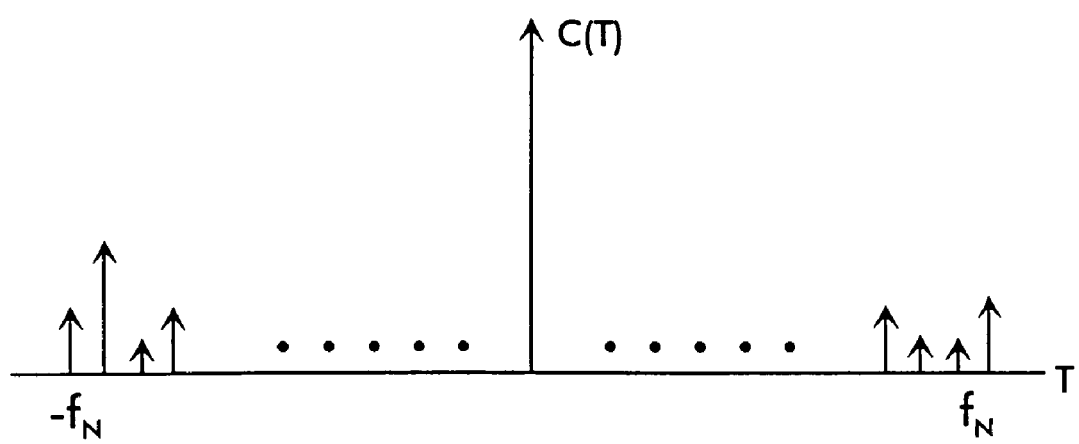
FIG. 23 shows an example of a correlation C(T) performed by the correlators of FIG. 22; and, FIG. 24 shows the synchronizer of FIG. 5 arranged for fine synchronization.

The correlators 60 and 62 perform their correlations essentially according the following equation:

$$C(T) = \sum_{t=-L/2}^{L/2} x(t) \cdot y*(t-T) \quad (1)$$

where L is defined as the number of samples in a chirp and is representative of the length of a chirp (i.e., the transmitted compound chirp, the reference up component, or the reference down component, which all have the same length), where the quantity x(t) represents the received compound chirp, where the quantity y(t−T) represents the reference up component or the reference down component, as appropriate, and where * represents a complex conjugate function. The index T in equation (1) is varied from −N to N, where T is the index number of the samples in a chirp, and where there are a total of N samples in a chirp. FIG. 23 shows an example of the correlations C(T) from −N to N. The correlation can be performed in any domain.

The index T in equation (1) should be varied by the correlator 60 over the whole up component, and the index T in equation (1) should be varied by the correlator 62 over the whole down component. Thus, each correlation is performed over all T. The center of the correlation is defined as the correlation point where T is 0. The results of the correlations performed by the correlators 60 and 62 are processed by the processor 68 in order to determine a block offset and a carrier frequency offset.

More specifically, the processor 68 weights the indices of the up correlation peaks with their corresponding peak amplitudes and averages these weighted correlation peak indices in order to determine an index $T_{up\text{-}peak}$, and the processor 68 weights the indices of the down correlation peaks with their corresponding peak amplitudes and averages these weighted correlation peak indices in order to determine an index $T_{down\text{-}peak}$. The block offset (i.e., the difference between the temporal location of the received data blocks as assumed by the receiver 14 and the actual temporal location of the data blocks as received) is determined by the processor 68 by summing the index $T_{up\text{-}peak}$ and the index $T_{down\text{-}peak}$. The carrier frequency offset (i.e., the difference between the received carrier frequency and the carrier frequency assumed by the receiver 14) is determined by the processor 68 by subtracting the index $T_{up\text{-}peak}$ and the index $T_{down\text{-}peak}$.

The block offset and the carrier frequency offset may be used as shown in FIG. 5 in order to synchronize the receiver 14 to the received carrier frequency and blocks of data. Accordingly, the data blocks are aligned by shifting each data block by the block offset or by using the block offset to reset the start of each data block at the receiver 14. Similarly, the carrier frequency in the receiver 14 is set according to the carrier frequency offset. Both data block alignment and carrier frequency setting can be performed at the same time.

Figure 24:
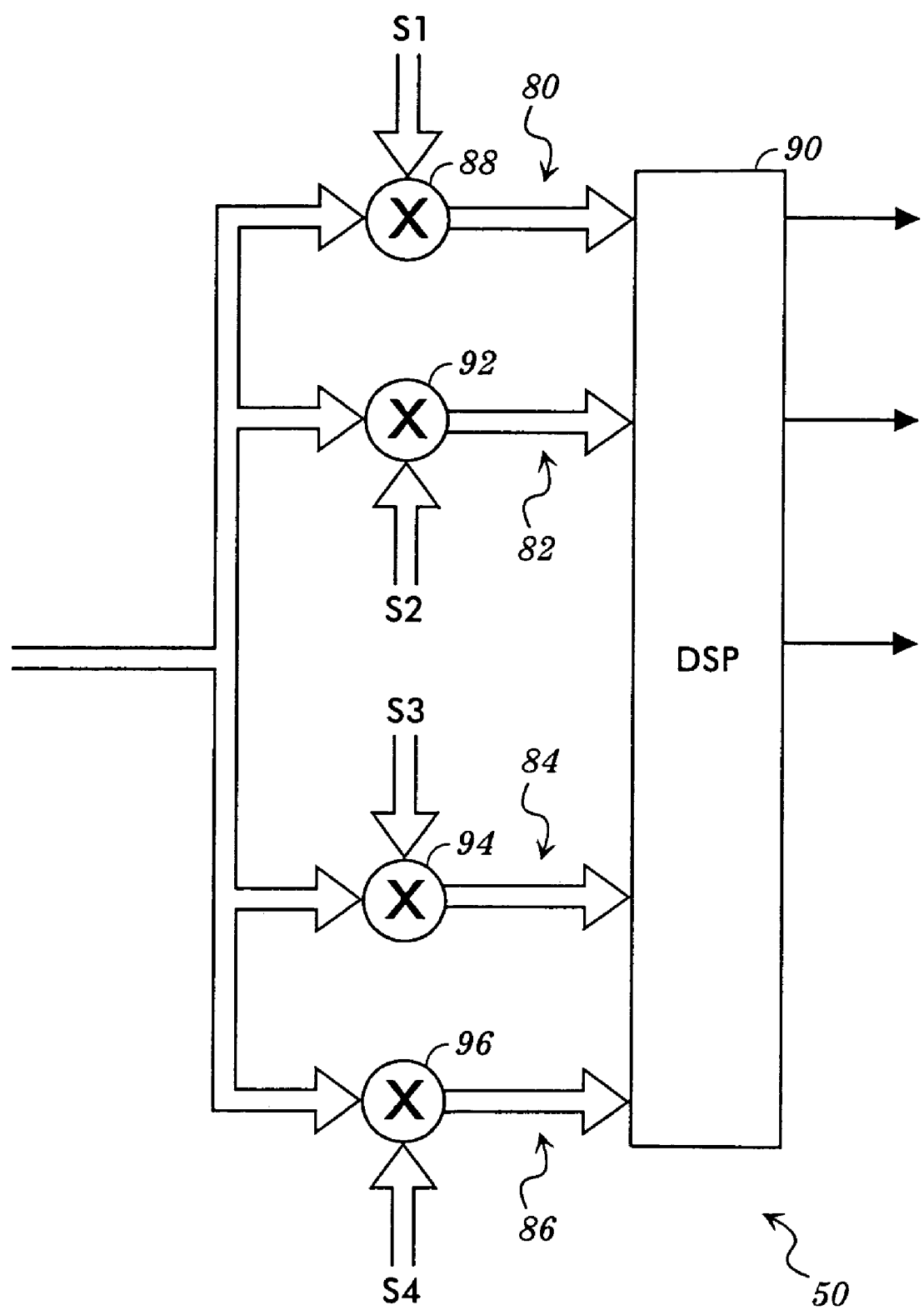

Fine adjustment of the synchronizer 50 is shown with respect to FIG. 24. The synchronizer 50 includes single point correlators 80, 82, 84, and 86. That is, the single point correlators 80, 82, 84, and 86 perform a correlation according to equation (1) with T set to 0 during the correlation (i.e., T is not varied). The single point correlator 80 includes a multiplier 88 and a processor 90 which perform a single point up correlation. The multiplier 88 multiplies the output of the FFT 48 by the reference S1. The single point correlator 82 includes a multiplier 92 and the processor 90 which perform a single point down correlation. The multiplier 92 multiplies the output of the FFT 48 by the reference S2. The single point correlator 84 includes a multiplier 94 and the processor 90 which perform a single point correlation. The multiplier 94 multiplies the output of the FFT 48 by a reference S3. The single point correlator 86 includes a multiplier 96 and the processor 90 which perform a single point correlation. The multiplier 96 multiplies the output of the FFT 48 by a reference S4.

The reference S1 is the reference up component described above, and is either of the VSB type or the QAM type depending upon whether the receiver 14 is operating in the VSB mode or the QAM mode. Similarly, the reference S2 is the reference down component described above, and is either of the VSB type or the QAM type depending upon whether the receiver 14 is operating in the VSB mode or the QAM mode.

The reference S3 is a reference compound chirp derived by shifting the compound chirp to the left by half of a sample, and the reference S4 is a reference compound chirp derived by shifting the compound chirp to the right by half of a sample.

The indices of the peaks resulting from the single point correlation 80 are weighted by the processor 90 with their corresponding peak amplitudes and are averaged by the processor 90 to determine the index $T_{up\text{-}peak}$, and the indices of the peaks resulting from the single point correlation 82 are similarly weighted by the processor 90 with their corresponding peak amplitudes and are averaged by the processor 90 to determine the index $T_{down\text{-}peak}$. The block offset is determined by the processor 90 by summing the index $T_{up\text{-}peak}$ and the index $T_{down\text{-}peak}$. The carrier frequency offset is determined by the processor 90 by subtracting the index $T_{up\text{-}peak}$ and the index $T_{down\text{-}peak}$.

The outputs of the single point correlations 84 and 86 are processed by the processor 90 according to the following expression in order to produce sampling clock frequency and phase information:

$$\left| \frac{\sum \Sigma(D \cdot R_{up})}{\Sigma (D \cdot R_{down})} \right| - 1 \qquad (2)$$

wherein D is the received signal with the compound chirp, wherein $R_{up}$ is the reference S3, and wherein $R_{down}$ is the reference S4. The sampling clock frequency and phase information may be used in a conventional manner in order to adjust the frequency and phase of the sampling clock so as to finely synchronize the receiver 14.

Certain modifications of the present invention have been discussed above. Other modifications will occur to those practicing in the art of the present invention. For example, the invention is described above in terms of a vestigial sideband (VSB) system and a quadrature amplitude modulation (QAM) system. However, in a modified form, the present invention described above also may be used in single sideband (SSB) and double sideband (DSB) systems.

Also, the present invention has been described above in the context of transmissions from the transmitter 12 to the receiver 14. However, the transmitter 12 and the receiver 14 may be bi-directional transmitting and receiving devices.

Moreover, the spectral transformations as described above are performed using an FFT pair (i.e., the IFFT 34 and the FFT 48). However, other transformations could be used to perform the spectral transformation.

Furthermore, as described above, the compound chirp created for VSB systems has more frequency folds than does the compound chirp created for QAM systems. Alternatively, the compound chirp created for QAM systems could have more frequency folds than does the compound chirp created for VSB systems, or the compound chirp created for VSB systems and the compound chirp created for QAM systems could have the same number of frequency folds. Also, the compound chirp created for VSB systems and the compound chirp created for QAM systems can have any number of folds.

Additionally, although the compound chirp and the reference up and down components are described above as being created in the same domain, the compound chirp and the reference up and down components could be created in any domain as long as the compound chirp and the reference up and down components are in the same domain at the time that they are correlated.

In addition, as described above, the indices of the correlation peaks are weighted and are averaged to determine the indices $T_{up\text{-}peak}$ and $T_{down\text{-}peak}$ as appropriate. Alternatively, the index of the biggest correlation peak from the up correlation and the index of the biggest correlation peak from the down correlation could be used as the indices $T_{up\text{-}peak}$ and $T_{down\text{-}peak}$, respectively. As a still further alternative, the centroid of the up correlation and the centroid of the down correlation could be used as the indices $T_{up\text{-}peak}$ and $T_{down\text{-}peak}$, respectively.

Also, as described above, a compound chirp includes both at least one up component and at least one down component. Instead, a compound chirp could include only plural up components or only plural down components.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A receiver, wherein the receiver receives a received signal containing a compound chirp having frequency up and frequency down components, wherein the frequency up and down components overlap in time, the receiver comprising:
   a first correlator arranged to correlate the received signal with the frequency up component to produce a first correlation, wherein the first correlator produces the first correlation by multiplying quantities related to the received signal and the frequency up component shifted with respect to one another over an index T and by summing results of the multiplication;
   a second correlator arranged to correlate the received signal with the frequency down component to produce a second correlation, wherein the second correlator produces the second correlation by multiplying quantities related to the received signal and the frequency down component shifted with respect to one another over an index T and by summing results of the multiplication; and,
   a processor arranged to determine synchronization parameters dependent upon the first and second correlations.

2. The receiver of claim 1 wherein the synchronization parameters include data block alignment offset.

3. The receiver of claim 2 wherein the processor determines the data block alignment offset by summing indices resulting from the first and second correlations.

4. The receiver of claim 1 wherein the synchronization parameters include carrier frequency offset.

5. The receiver of claim 4 wherein the processor determines the carrier frequency offset by subtracting indices resulting from the first and second correlations.

6. The receiver of claim 1 wherein the synchronization parameters include data block alignment offset and carrier frequency offset.

7. The receiver of claim 6 wherein the processor determines the data block alignment offset by summing indices resulting from the first and second correlations, and wherein the processor determines the carrier frequency offset by subtracting the indices resulting from the first and second correlations.

8. The receiver of claim 1 wherein the first and second correlators comprise multipliers, and wherein the receiver further comprises third and fourth multipliers, wherein the third multiplier is arranged to multiply the received signal with a first reference compound chirp to produce a third correlation, wherein the fourth multiplier is arranged to multiply the received signal with a second reference compound chirp to produce a fourth correlation, wherein the first and second reference compound chirps are the compound chirp half sample shifted to the left and to the right respectively, and wherein the processor is arranged to determine the synchronization parameters dependent upon the third and fourth correlations.

9. The receiver of claim 8 wherein the synchronization parameters include data block alignment offset.

10. The receiver of claim 9 wherein the processor determines the data block alignment offset by summing indices resulting from the first and second correlations.

11. The receiver of claim 8 wherein the synchronization parameters include carrier frequency offset.

12. The receiver of claim 11 wherein the processor determines the carrier frequency offset by subtracting indices resulting from the first and second correlations.

13. The receiver of claim 8 wherein the synchronization parameters include data block alignment offset and carrier frequency offset.

14. The receiver of claim 13 wherein the processor determines the data block alignment offset by summing indices resulting from the first and second correlations, and wherein the processor determines the carrier frequency offset by subtracting the indices resulting from the first and second correlations.

15. The receiver of claim 1 wherein the synchronization parameters include sampling frequency information.

16. The receiver of claim 1 wherein the compound chirp comprises N samples derived by (i) producing mN samples representing a signal having an increasing or decreasing frequency, (ii) partitioning the mN samples into m segments each having N samples, wherein the m segments include m/2 even segments and m/2 odd segments, (iii) processing one of the m/2 even segments and the m/2 odd segments so that the processed segments represent a phase shifted chirp segment having a frequency changing in an opposite sense to the frequency of the signal, and (iv) combining the processed one of the m/2 even segments and the m/2 odd segments with the other of the m/2 even segments and the m/2 odd segments so as to produce the N samples, wherein N and m are integers unequal to one.

17. The receiver of claim 16 wherein m=8.

18. The receiver of claim 16 wherein N=512.

19. The receiver of claim 18 wherein m=8.

20. The receiver of claim 16 wherein N=4096.

21. The receiver of claim 20 wherein m=8.

22. The receiver of claim 16 wherein the processed segments are produced by complex conjugating the m/2 even segments or the m/2 odd segments and by index reversing the complex conjugated even or odd segments.

23. The receiver of claim 22 wherein the combining of the processed one of the m/2 even segments and the m/2 odd segments with the other of the m/2 even segments and the m/2 odd segments comprises linearly adding the processed one of the m/2 even segments and the m/2 odd segments and the other of the m/2 even segments and the m/2 odd segments.

24. The receiver of claim 22 wherein the N samples are derived by sampling at a Nyquist frequency, and wherein the mN samples are produced so as to represent a signal having a frequency that varies between a low value and the Nyquist frequency.

25. The receiver of claim 24 wherein the combining of the processed one of the m/2 even segments and the m/2 odd segments with the other of the m/2 even segments and the m/2 odd segments comprises linearly adding the processed one of the m/2 even segments and the m/2 odd segments and the other of the m/2 even segments and the m/2 odd segments.

26. The receiver of claim 16 wherein the combining of the processed one of the m/2 even segments and the m/2 odd segments with the other of the m/2 even segments and the m/2 odd segments comprises linearly adding the processed one of the m/2 even segments and the m/2 odd segments and the other of the m/2 even segments and the m/2 odd segments.

27. The receiver of claim 16 wherein the N samples are derived by sampling at a Nyquist frequency, and wherein the mN samples are produced so as to represent a signal having a frequency that varies between a low value and the Nyquist frequency.

28. The receiver of claim 27 wherein the combining of the processed one of the m/2 even segments and the m/2 odd segments with the other of the m/2 even segments and the m/2 odd segments comprises linearly adding the processed one of the m/2 even segments and the m/2 odd segments and the other of the m/2 even segments and the m/2 odd segments.

29. The receiver of claim 1 wherein the first correlation is a weighted average of correlation peaks produced by the first correlator, and wherein the second correlation is a weighted average of correlation peaks produced by the second correlator.

30. The receiver of claim 1 wherein the up component of the compound chirp varies in time from a starting frequency $f_0$ to a terminating frequency $f_1$, wherein the down component of the compound chirp varies in time from a starting frequency $f_2$ to a terminating frequency of about $f_1$, wherein $f_0 < f_1 < f_2$, and wherein the up and down components overlap in time so that $f_0$ of the up component occurs near in time to $f_2$ of the down component.

31. The receiver of claim 1 wherein the compound chirp comprises K frequency folds, wherein each frequency fold includes a frequency up component and a frequency down component, wherein K>one, and wherein all of the K frequency folds overlap in time.

32. A method comprising:
receiving a signal containing a transmitted compound chirp having N samples, wherein the chirp is constructed so that the chirp effectively spans mN samples, wherein m and N are integers, wherein m and N are unequal to one, and wherein the N samples of the compound chirp are derived by (i) producing mN samples representing a signal having an increasing or decreasing frequency, (ii) partitioning the mN samples into m segments each having N samples, (iii) processing m/2 of the m segments so that m/2 of the m segments are unprocessed and so that the m/2 processed segments represent a chirp segment having a frequency changing in an opposite sense to the frequency of the signal, and (iv) combining the m/2 processed segments and the m/2 unprocessed segments so as to produce the N samples;
correlating the received signal with a reference chirp; and,
synchronizing a receiver in response to the correlation.

33. The method of claim 32 wherein the correlating of the received signal with the reference chirp comprises:
correlating the received signal with a reference frequency up component to produce a first correlation; and,
correlating the received signal with a reference frequency down component to produce a second correlation.

34. The method of claim 33 wherein the synchronizing of the receiver comprises synchronizing the receiver based upon a summation of indices resulting from the first and second correlations.

35. The method of claim 33 wherein the synchronizing of the receiver comprises synchronizing the receiver based upon a subtraction of indices resulting from the first and second correlations.

36. The method of claim 35 wherein the synchronizing of the receiver comprises synchronizing the receiver based upon a summation of indices resulting from the first and second correlations.

37. The method of claim 33 wherein the synchronizing of the receiver comprises:
correlating the received signal with a first reference compound chirp to produce a third correlation;
correlating the received signal with a second reference compound chirp to produce a fourth correlation, wherein the first and second reference compound chirps are the compound chirp half sample shifted to the left and to the right respectively; and, synchronizing the receiver in response to the first, second, third, and fourth correlations.

38. The method of claim 37 wherein the synchronizing of the receiver comprises synchronizing the receiver based upon a summation of indices resulting from the first and second correlations.

39. The method of claim 37 wherein the synchronizing of the receiver comprises synchronizing the receiver based upon a subtraction of indices resulting from the first and second correlations.

40. The method of claim 38 wherein the synchronizing of the receiver comprises synchronizing the receiver based upon a summation of indices resulting from the first and second correlations.

41. The method of claim 32 wherein the m/2 processed segments are produced by complex conjugation.

42. The method of claim 41 wherein the combining of the the m/2 processed segments and the m/2 unprocessed segments comprises linearly adding the m/2 processed segments and the m/2 unprocessed segments.

43. The method of claim 32 wherein the combining of the the m/2 processed segments and the m/2 unprocessed segments comprises linearly adding the m/2 processed segments and the m/2 unprocessed segments.

44. The method of claim 32 wherein m<N.

45. The method of claim 32 wherein the compound chirp comprises at least one up component and at least one down component.

46. The method of claim 32 wherein the compound chirp comprises only up components.

47. The method of claim 32 wherein the compound chirp comprises only down components.

48. The method of claim 32 wherein the compound chirp has a frequency up component and a frequency down component, wherein the frequency up component varies in time from a starting frequency $f_0$ to a terminating frequency $f_1$, wherein the frequency down component varies in time from a starting frequency $f_2$ to a terminating frequency of about $f_1$, wherein $f_0 < f_1 < f_2$, and wherein the frequency up and frequency down components overlap in time so that $f_0$ of the frequency up component occurs near in time to $f_2$ of the frequency down component.

49. A method of receiving a received signal containing a compound chirp having frequency up and frequency down components, wherein the up component varies in time from a starting frequency $f_0$ to a terminating frequency $f_1$, wherein the down component varies in time from a starting frequency $f_2$ to a terminating frequency of about $f_1$, wherein $f_0 < f_1 < f_2$, and wherein the frequency up and down components overlap in time so that $f_0$ of the up component occurs near in time to $f_2$ of the down component, the method comprising:

correlating the received signal with the frequency up component to produce a first correlation;

correlating the received signal with the frequency down component to produce a second correlation; and, synchronizing a receiver based upon the first and second correlations.

50. The method of claim 49 wherein the synchronizing of the receiver includes performing data block alignment.

51. The method of claim 50 wherein the performing of data block alignment comprises summing indices resulting from the first and second correlations.

52. The method of claim 49 wherein the synchronizing of the receiver includes performing carrier frequency adjustment.

53. The method of claim 52 wherein the performing of carrier frequency adjustment comprises subtracting indices resulting from the first and second correlations.

54. The method of claim 49 wherein the synchronizing of the receiver comprises performing data block alignment and carrier frequency adjustment.

55. The method of claim 54 wherein the performing of data block alignment and carrier frequency adjustment comprises summing and subtracting indices resulting from the first and second correlations.

56. The method of claim 49 wherein the method further comprises:

correlating the received signal with a first reference compound chirp to produce a third correlation, wherein the first reference compound chirp is the compound chirp half sample shifted to the left;

correlating the received signal with a second reference compound chirp to produce a fourth correlation, wherein the second reference compound chirp is the compound chirp half sample shifted to the right; and, wherein the synchronizing of the receiver comprises synchronizing the receiver based upon the first, second, third, and fourth correlations.

57. The method of claim 56 wherein the synchronizing of the receiver includes performing data block alignment.

58. The method of claim 57 wherein the performing of data block alignment comprises summing indices resulting from the first and second correlations.

59. The method of claim 56 wherein the synchronizing of the receiver includes performing carrier frequency adjustment.

60. The method of claim 59 wherein the performing of carrier frequency adjustment comprises subtracting indices resulting from the first and second correlations.

61. The method of claim 56 wherein the synchronizing of the receiver comprises performing data block alignment and carrier frequency adjustment.

62. The method of claim 61 wherein the performing of data block alignment and carrier frequency adjustment comprises summing and subtracting indices resulting from the first and second correlations.

63. The method of claim 49 wherein the compound chirp comprises N samples derived by (i) producing mN samples representing a signal having an increasing or decreasing frequency, (ii) partitioning the mN samples into m segments each having N samples, wherein the m segments include m/2 even segments and m/2 odd segments, (iii) processing the m/2 even segments or the m/2 odd segments so that m/2 of the m segments are unprocessed and so that the processed m/2 segments represent a phase shifted chirp segment having a frequency changing in an opposite sense to the frequency of the signal, and (iv) combining the processed one of the m/2 even segments and the m/2 odd segments with the other of the m/2 even segments and the m/2 odd segments so as to produce the N samples (iv) combining the m/2 processed segments and the m/2 unprocessed segments so as to produce the N samples, wherein N and m are integers unequal to one.

64. The method of claim 63 wherein the processed segments are produced by complex conjugating the m/2 even segments or the m/2 odd segments and by index reversing the complex conjugated even or odd segments.

65. The method of claim 64 wherein the combining of the processed one of the m/2 even segments and the m/2 odd segments with the other of the m/2 even segments and the m/2 odd segments comprises linearly adding the processed one of the m/2 even segments and the m/2 odd segments and the other of the m/2 even segments and the m/2 odd segments.

66. The method of claim 44 wherein the compound chirp comprises K frequency folds, wherein each frequency fold includes one of the frequency up components and one of the frequency down components, wherein K>one, and wherein all of the K frequency folds overlap in time.

67. A receiver synchronization method comprising:
receiving a signal, wherein the received signal includes a compound chirp comprising an up component and a down component, wherein the up component varies in time from a starting frequency $f_0$ to a terminating frequency $f_1$, wherein the down component varies in time from a starting frequency $f_2$ to a terminating frequency of about $f_1$, wherein $f_0<f_1<f_2$, and wherein the up and down components overlap in time so that $f_0$ of the up component occurs near in time to $f_2$ of the down component; and,
synchronizing the receiver to the received signal by use of the compound chirp.

68. The method of claim 67 wherein the receiving of a signal including a compound chirp comprises receiving the compound chirp comprising N samples having an effective range of mN samples, and wherein m and N are integers unequal to one.

69. The method of claim 68 wherein N=512.

70. The method of claim 68 wherein m=8.

71. The method of claim 68 wherein N=4096.

72. The method of claim 70 wherein m=8.

73. The method of claim 68 wherein the mN samples are produced so as to represent a signal having a frequency that varies between a low value and a Nyquist frequency.

74. The method of claim 67 wherein the receiving of a signal including a compound chirp comprises receiving the compound chirp comprising N samples, and wherein the N samples are derived by (i) producing mN samples representing a signal increasing or decreasing in frequency, (ii) partitioning the mN samples into m segments each having N samples, (iii) processing m/2 of the m segments so that m/2 of the m segments are unprocessed and so that the processed m/2 segments represent a chirp segment having a frequency changing in an opposite sense to the frequency of the signal, and (iv) combining the m/2 processed segments and the m/2 unprocessed segments so as to produce the N samples, wherein N and m are integers unequal to one.

75. The method of claim 68 wherein m=8.

76. The method of claim 74 wherein the processed segments are produced by complex conjugating the segments being processed and by index reversing the complex conjugated segments being processed.

77. The method of claim 76 wherein the combining of the m/2 processed segments and the m/2 unprocessed segments comprising linearly adding the m/2 processed segments and the m/2 processed segments.

78. The method of claim 76 wherein the mN samples are produced so as to represent a signal having a frequency that varies between a low value and a Nyquist frequency.

79. The method of claim 76 wherein the combining of the m/2 processed segments and the m/2 unprocessed segments comprises linearly adding the m/2 processed segments and the m/2 unprocessed segments.

80. The method of claim 68 wherein the combining of the m/2 processed segments and the m/2 unprocessed segments comprises linearly adding the m/2 processed segments and the m/2 unprocessed segments.

81. The method of claim 67 wherein the receiving of a signal including a compound chirp comprises receiving a compound chirp spanning a bandwidth of a channel through which the method is transmitted.

82. The method of claim 67 wherein the down component varies in time from a starting frequency $f_2$ to a terminating frequency $f_{1''}$, wherein $f_1$ is near $f_{1''}$, wherein $f_0<f_1<f_{1''}<f_2$, and wherein the up and down components overlap in time so that $f_1$ of the up component occurs near in time to $f_{1''}$ of the down component.

83. The method of claim 67 wherein the compound chirp comprises K frequency folds, wherein each frequency fold includes one of the frequency up components and one of the frequency down components, wherein K>one, and wherein all of the K frequency folds overlap in time.

* * * * *